UNITED STATES PATENT OFFICE 3,799,979
Patented Mar. 26, 1974

3,799,979
PROCESS FOR THE PRODUCTION OF ALPHA, BETA-UNSATURATED CARBOXYLIC ACIDS
Jorg Hensel and Theodor Lussling, Grossauheim, Ewald Noll, Gross-Krotzenburg, Hans Schaefer and Gerd Schreyer, Grossauheim, and Wolfgang Weigert, Offenbach, Germany, assignors to Deutsche Gold- und Silber-Scheideanstalt vormals Roessler, Frankfurt am Main, Germany
No Drawing. Filed May 25, 1972, Ser. No. 256,676
Claims priority, application Germany, May 28, 1971,
P 21 26 534.9
Int. Cl. C07c 51/20, 57/04
U.S. Cl. 260—533 N                28 Claims

ABSTRACT OF THE DISCLOSURE

Alpha, beta unsaturated carboxylic acids are produced by catalytically oxidizing alkenes with oxygen, suitably in the presence of steam, on a mixed catalyst bed consisting of a mixture and/or compound of oxides of antimony, molybdenum, vanadium, and tungsten and in a given case one or more oxides of lead, silver, copper, tin, titanium, bismuth and/or oxygen containing compounds of these elements as the first catalyst and a mixture and/or compounds of oxides of nickel, cobalt, iron, bismuth, phosphorus, molybdenum and in a given case samarium or tantalum and/or oxygen containing compounds of these elements as second catalysts. The catalysts can include carriers.

---

The invention is directed to a process for the catalytic gas phase oxidation of alkenes with oxygen or oxygen containing gas to the corresponding $\alpha,\beta$-unsaturated carboxylic acids and especially the catalytic gas phase oxidation of propylene to acrylic acid. The catalysts of the invention can be used, however, to convert other alkenes to the corresponding acids. Thus there can be used isobutylene to form methacrylic acid.

Numerous processes have been described for converting alkenes into alpha, beta unsaturated acids by catalytic gas phase oxidation with oxygen and oxygen containing gases. In one series thereof in a first reaction step the alkene is converted over a suitable catalyst preponderantly into the corresponding alpha, beta unsaturated aldehyde, for example propylene is converted to acrolein. Then in a second reactor, in the presence of a second catalyst suitable for this reaction step, the alpha, beta unsaturated aldehyde likewise through gas phase oxidation with oxygen or oxygen containing gases, is converted into the alpha, beta unsaturated acid, for example acrolein is is converted into acrylic acid. The disadvantages of such a process are evident. Two reactors must be operated, regulated and loaded with suitable reaction mixtures. In a given case the alpha, beta unsaturated aldehyde formed in the first reaction step is isolated before introduction into the second step and separated from small amounts of alpha, beta unsaturated carboxylic acid already formed as byproduct in the first reaction step.

More convenient in contrast are processes in which the conversion of the alkene into the alpha, beta, unsaturated carboxylic acid takes place in a single reaction step using only one catalyst loaded reactor. Of the known single step processes and catalysts there are only a few which appear to be industrially valuable, i.e. capable of converting alkenes with high conversion and high yields at short residence times into the corresponding alpha, beta unsaturated carboxylic acid. Thus in Goodrich English Pat. 1,038,634, there is described at catalyst system containing $Mo_{10}Te_{1-10}Mn_{2-20}P_{2-20}O_{39-120}$ with the P being combined with 3 or 4 atoms of oxygen. The system converts propylene into acrylic acid with good yields based on the starting material but with space-time-yields which are too low for industrial use. Accordingly, a process disclosed in Montecatini Netherlands published application 6806577 a better space-time-yield was obtained. However, the yields of acrylic acid based on the starting material are unsatisfactory. Finally in Knapsack Netherlands published application 6913173 a process is recited which produces good yields of acrylic acid based on the starting material an good space-time-yields in the catalytic gas phase oxidation of propylene in which the reaction mixture is conducted through a reactor which contains two catalyst layers. The catalyst of the first layer has the composition $Ag_{0-1.5}Fe_{0.1-12}Bi_{0.1-12}P_{0-5}Mo_{12}O_{30-110}$ and converts the propylene fed in the acrolein while the catalyst in the subsequent layer having the composition $Co_{0.5-1.5}Mo_1Te_{0-1}B_{0-1}O_{3-3}$ converts the acrolein to acrylic acid. Of course these good results were only obtained if the reactor mixture was recycled whereby the unreacted propylene and acrolein in the single passage was separated from the acrylic acid formed before return to the reactor.

There has now been found an improved process for the production of alpha, beta unsaturated carboxylic acids by the catalytic gas phase oxidation of alkenes with oxygen or oxygen containing gases, e.g. air, which is characterized in that alkenes are reacted with oxygen or oxygen containing gases, more suitably in the presence of steam and on a catalyst mixed bed consisting of a mixture and/or compounds of oxides or the elements antimony, molybdenum, vanadium tungsten and eventually one or more oxides of the elements lead, silver, copper, tin, titanium, bismuth and/or oxygen containing compounds of these elements as first catalyst and a mixture and/or compounds of oxides of the elements nickel, cobalt, iron, bismuth, phosphorus, molybdenum and in a given case samarium or tantalum and/or oxygen containing compounds of these elements as a second catalyst wherein both catalysts in a given case can include carrier material. It is not essential, however, to employe a carrier.

The first catalyst contains antimony, molybdenum, vanadium, tungsten and in a given case as additional components one of the elements lead, silver, copper, tin, titanium and bismuth. It is produced as disclosed in German applications 20 09 172 and 20 50 155. The entire disclosure of these two published German applications is hereby incorporated by reference.

The catalyst has the general formula

I   $Sb_{1-60}Mo_{12}V_{0.5-25}W_{0.1-12}M_{0-12}O_x$ where X is about 35 to 250 and M is lead, silver, copper, tin, titanium or bismuth. Preferably the formula is $Sb_{3-40}Mo_{12}V_{1-12}W_{0.1-6}M_{0-6}$ oxide, most preferably

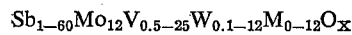
$Sb_{3-15}Mo_{12}V_{1-8}W_{0.5-3}M_{0-3}$

This catalyst is a selective catalyst for the conversion of acrolein to acrylic acid (and for converting other alpha, beta unsaturated aldehydes to the corresponding alpha, beta unsaturated carboxylic acids, e.g. methacrolein to methacrylic acid).

Examples of catalysts within Formula I are:
$Sb_6Mo_{12}V_3W_{1.2}$ oxide (prepared according to Example 1 of German Offenlegungsschrift 2,009,172).
$Sb_8Mo_{12}V_3W_{1.2}$ oxide (prepared according to Example 6 of German Offenlegungsschrift 2,009,172).
$Sb_{14.4}Mo_{12}V_3W_{1.2}$ oxide (prepared according to Example 7 of German Offenlegungsschrift 2,009,172).
$Sb_3Mo_{12}V_3W_{1.2}$ oxide (prepared according to Example 8 of German Offenlegungsschrift 2,009,172).

The second catalyst has the formula

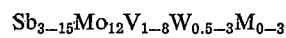
II   $Ni_aCo_bFe_cBi_dP_eMo_fO_g,$ where $a$ is a number from 0 to 20, $b$ is a number from 0 to 15, $a$ and $b$ together are a number from 2 to 20, $c$ is a number from 0.1 to 7, $d$ is a number from 0.1 to 4, $e$ is a number from 0.1 to 2, $f$ is a number of about 12 and $g$ is a number from 35 to 85 together with 0 to 5 weight percent of samarium oxide ($Sm_2O_3$). When samarium oxide is present it is normally employed in an amount of 0.2 to 5.0%, preferably 0.5 to 2.0% based on the total Catalyst II. In place of samarium oxide there can be used tantalum oxide ($Ta_2O_5$) in the same weight range.

The catalyst of Formula II is produced as described in Koberstein, U.S. Pat. 3,639,269 Feb. 1, 1972 and Koberstein U.S. application 187,875, filed Oct. 8, 1971 and corresponding German Offenlegungschrift P 17 92 424.2 and P 20 49 583.4. The entire disclosure of the Koberstein U.S. patent and the Koberstein U.S. application are hereby incorporated by reference.

Catalyst II has good selectivity in catalyzing the oxidation of propylene predominantly to acrolein.

Examples of catalysts within Formula II are $Ni_{10.5}Fe_1Bi_1P_1Mo_{12}O_{57}$
$Ni_{10}Co_{0.3}Fe_1Bi_1P_{0.2}Mo_{12}O_{53}$
$Ni_{10}Co_{0.3}Fe_1Bi_1P_1Mo_{12}O_{57}$
$Ni_{10}Co_{0.3}Fe_1Bi_1P_{0.5}Mo_{12}O_{56}$
$Ni_{4.5}Co_4Fe_1Bi_1P_1Mo_{12}O_{54}$
$Ni_7Co_{0.5}Fe_2Bi_2P_1Mo_{12}O_{54}$
$Ni_7Co_2Fe_1Bi_1P_1Mo_{12}O_{54}$
$Ni_{10.5}Fe_1Bi_1P_{0.5}Mo_{12}O_{56}$
$Ni_{10.5}Fe_1Bi_1P_{1.5}Mo_{12}O_{58}$
$Ni_{7.5}Fe_2Bi_2P_1Mo_{12}O_{55}$
$Ni_{4.5}Fe_3Bi_3P_{0.8}Mo_{12}O_{53}$
$Ni_{12}Fe_{1.3}Bi_{0.7}P_1Mo_{12}O_{58}$
$Ni_{14}Fe_1Bi_1P_1Mo_{12}O_{60}$
$Ni_{10.5}Fe_{0.5}Bi_{1.5}P_1Mo_{12}O_{57}$
$Co_6Fe_1Bi_1P_1Mo_{12}O_{50}$
$Co_{4.5}Fe_{1.5}Bi_{1.5}P_1Mo_{12}O_{49}$
$Ni_{10}Fe_{0.5}Bi_{1.5}P_1Mo_{12}O_{57}$
$Ni_{10}Co_{0.3}Fe_1Bi_1P_{0.5}Mo_{12}O_{54}$
$Ni_{4.5}Co_4Fe_1Bi_1P_1Mo_{12}O_{52}$
$Ni_7Co_2Fe_1Bi_1P_1Mo_{12}O_{53}$
$Ni_{10}Co_{0.3}Fe_1Bi_1P_1Mo_{12}O_{51}$ Examples of catalysts of Formula II including samarium oxide or tantalum oxide include $Ni_{10}Co_{0.3}Fe_1Bi_1P_1Mo_{12}O_{57}$ with 1% $Sm_2O_3$ or 1% $Ta_2O_5$.

The catalysts can be used as such or more preferably are placed on a carrier or mixed with a carrier. As carriers there can be used for example alumina, silica and other customary carriers, e.g. silicon carbide. Advantageously the catalysts contain a carrier mixture of one or several constituents with a small specific surface area (0.5 to 30 m.²/g.) and one or more constituents with a larger surface area (50–500 m.²/g.) Highly dispersed silica or kieselguhr, preferably mixtures of highly dispersed silica and kieselguhr and/or montmorillonite, have been found especially suitable as carriers.

The montmorillonite before mixing with the silica is advantageously heated to 900 to 1200° C., e.g. for 1 to 10 hours, most preferably for 4 to 6 hours at 975 to 1050° C., e.g. 5 hours at 1000° C. Before this heating the montmorillonite can be treated with acids, especially hydrochloric acid, nitric acid, phosphoric acid or sulfuric acid.

An especially advantageous development of the invention is to formulate the activity and selectivity of both catalysts (i.e. Catalysts I and II) not only by the choice of the suitable composition but also by the choice of suitable particle or tablet sizes to each other. In a given case three can be chosen different particles or tablet sizes for both catalysts. Thus the particle size or tablet diameter and height can range between 2 and 8 mm. A further possibility for the formulation of both catalysts is in the choice of suitable volume proportions of both catalysts to each other in the mixed catalyst bed. These proportions can vary in the range between 8 and 2 and 2 to 8 in parts by volume.

The process of the invention differs in an advantageous manner from previous processes not only in giving good yields but also in making possible high throughputs and concomittant good space-time-yields. Surprisingly the selected catalysts are very well balanced to each other in their reaction proportions in the mixed bed. This was not to be expected since the catalyst of Formula II for converting the alkenes into alpha, beta unsaturated aldehyde requires different reaction conditions (especially higher temperatures) than the catalyst of Formula I needs for converting alpha, beta unsaturated aldehydes into alpha, beta unsaturated carboxylic acids. The transformation using the mixed catalyst bed according to the invention is so complete that a higher addition of propylene is attained and only a little unreacted acrolein remains in the reaction mixture. Also there are obtained good acrylic acid yields based on the starting materials and good space-time-yields whereby there is eliminated the recycling of the reaction mixture.

The oxidation of alkenes to alpha, beta unsaturated carboxylic acids according to the process of the invention takes place in the customary manner by the addition of oxygen in the presence of water in the vapor phase. A wide range of reaction conditions can be employed. The reaction is usually carried out at atmospheric pressure or at slight super atmospheric pressure up to above 3 atmospheres and at temperatures between 280 and 400° C., preferably between 300 and 380° C. Higher pressures can be used if desired. As molar proportions of alkene to air there can be used form 1.8 to 1:20, preferably 1:8 to 1:15; as molar proportions of alkene to water 1:1 to 1:25, preferably 1:2 to 1:8. Advantageously there is employed a residence time of 0.5 to 10, preferably 1 to 4 seconds.

Unless otherwise indicated all parts and percentages are by weight.

In the following examples there are used the terms:

Propylene Feed
$$= \frac{\text{Propylene added}}{\text{Bulk volume of catalyst} \times \text{time}} \left[ \frac{\text{mols}}{\text{liters} \times \text{hours}} \right]$$

$$\text{Conversion} = \frac{\text{Moles of converted propylene}}{\text{Moles of propylene added}} \times 100 \, [\%]$$

Yield (based on starting material)
$$= \frac{\text{Moles of product}}{\text{Moles of propylene added}} \times 100 \, [\%]$$

Space-time-yield
$$= \frac{\text{Product obtained}}{\text{Bulk volume of catalyst} \times \text{time}} \left[ \frac{\text{grams}}{\text{liters} \times \text{hrs.}} \right]$$

EXAMPLE 1

(A) Production of Catalyst II Having the composition $Ni_{10}Co_{0.3}Fe_1Bi_1Mo_{12}O_{57}+1$ weight percent $Sm_2O_3$ With stirring there were brought together an aqueous solution of 2908 grams of $Ni(NO_3)_2.6H_2O$, 87.3 grams of $Co(No_3)_2.6H_2O$ and 404 grams of $Fe(NO_3)_3.9H_2O$ in 1940 grams of water; a nitric acid solution containing 186 grams of nitric acid, 133 grams of water and 29.6 grams of $Sm_2O_3$; a mixture of 968 grams of finely divided montmorillonite (which had been pretreated at 1020° C. for 5 hours) with 520 grams of silica (specifically the pyrogenic silica available as Aerosil 200); an aqueous solution of 2118 grams of $(NH_4)_6Mo_7O_{24}.4H_2O$ and 115.5 grams of 85% phosphoric acid and 6700 grams of water, and a nitric acid solution containing 48 grams of nitric acid, 360 grams of water and 485 grams of $Bi(NO_3)_3.5H_2O$ The resulting suspension was brought to dryness on a roller drier. The dry material was heated for 2 hours at 250° C. with the introduction of air and was held in motion during this time. The product was cooled, ground and pressed into tablets having a diameter of 5 mm. and a height of 5 mm. The tablets were heated at 650° C. for 20 minutes while introducing air.

B. Production of Catalyst I having the Composition $Sb_6Mo_{12}V_3W_{1.2}$ Oxide 2262 grams of ammonium heptamoylbdate $(NH_4)_6Mo_7O_{24} \cdot 4H_2O$ were dissolved in 14.5 liters of water below 50° C. Into this solution there were added with stirring 934 grams of antimony (III) oxide ($Sb_2O_3$), 924 grams of highly dispersed silica powder (specifically Aerosil 200), 1477 grams of finely divided montmorillonite which had been pretreated by heating for 5 hours at 1000° C., 374.5 grams of ammonium vanadate ($NH_4VO_3$) dissolved in 11 liters of hot water and 324.5 grams of ammonium dodecatungstate $(NH_4)_{10}W_{12}O_{41}$ suspended in 900 ml. of water. The mixture was brought to a pH of 3 and a volume of 42 liters with nitric acid and water and heated for 2 hours with stirring at 60° C. Finally the mixture was substantially freed of water on the roller drier, heated in air for 2 hours at 200° C., cooled and after the addition of 3 weight percent of powdered graphite, pressed into tablets having a diameter of 5 mm. and a height of 5 mm. (The graphite can be used in an amount of 1 to 10%, preferably 2 to 5% of the composition.) The briquettes were subsequently heated in the rotary kiln at 445° C. in air for about 5 minutes. The catalyst contained antimony, molybdenum, vanadium and tungsten in the molar proportions of 6:12:3:1.2 and a mixture of the silica (Aerosil 200) and montmorillonite as carriers.

C. Production of acrylic acid

Catalysts I and II were mixed in the proportions of bulk volume of 1:1 and 75 ml. of this catalyst mixture was poured into a solid bed reactor made of stainless steel having an inner diameter of 20 mm. and a length of 410 mm. which was heated by a salt bath to 320° C. At this temperature a gas mixture of propylene, air and steam in the molar proportions of 1:8:2 was led over the catalyst charge. The propylene feed was 2.44 mols/liter×hours. The propylene conversion was 75% and there was produced acrylic acid in a yield of 41% based on the propylene added. There was also formed 1.8% of acrolein.

EXAMPLE 2

The procedure was the same as in Example 1 with the modification that the salt bath temperature was 340° C. and the gaseous mixture employed contained propylene, air and steam in the molar proportions of 1:10:2. The propylene feed was 2.44 mol/l.×h. The propylene conversion was 83%, the acrylic acid yield was 45% and there was also formed 0.8% of acrolein. The acrylic acid space-time-yield was 79 grams/l.×h.

EXAMPLE 3

The process of Example 2 was followed. However, the Catalyst II was used in the form of tablets having a diameter of 4 mm. and a height of 4 mm. and the temperature of the salt bath was 341° C. The propylene conversion was 86%. For acrylic acid yield of 45% and a space-time-yield of 79 grams of acrylic acid/l.×h. were produced. There was also formed 3.1% of acrolein.

EXAMPLE 4

The procedure of Example 2 was followed but Catalyst II was reduced to a particle size of 2–3.15 mm. and the temperature of the salt bath was 320° C. The propylene conversion was 81%. An acrylic acid yield of 50% and a space-time-yield of 88 grams of acrylic acid/l.×h. were produced. There was also formed 1.9% of acrolein.

EXAMPLE 5

The procedure of Example 2 was followed but Catalyst II was reduced to a particle size of 2–3.15 mm. and the Catalysts I and II were mixed in the proportions of bulk volume of 3:7 and the temperature of the salt bath was 320° C. The propylene conversion was 90%.

An acrylic acid yield of 59% and a space-time-yield of 104 grams of acrylic acid/l.×h. were produced. There was also formed 7.2% of acrolein.

While air is the preferred oxidizing agent, there can be used pure oxygen or mixtures of oxygen with gases inert in the reaction such as nitrogen, argon or the like.

What is claimed is:

1. A process of producing a carboxylic acid selected from the group consisting of acrylic acid and methacrylic acid comprising the gas phase oxidation of an alkene selected from the group consisting of propylene and isobutylene with an oxygen containing gas and employing a mixture of catalysts consisting essentially of (A) $Sb_{1-60}Mo_{12}V_{0.5-25}W_{0.1-12}M_{0-12}O_x$ where $x$ is about 35 to 250 and M is an element selected from the group consisting of lead, silver, copper, tin, titanium and bismuth, and (B) $Ni_aCo_bFe_cBi_dP_eMo_fO_g$ where $a$ is a number from 0 to 20, $b$ is a number from 0 to 15, $a$ and $b$ together are a number from 2 to 20, $c$ is a number from 0.1 to 7, $d$ is a number from 0.1 to 4, $e$ is a number from 0.1 to 2, $f$ is a number of about 12 and $g$ is a number of 35 to 85 with up 5% of $Sm_2O_3$ or $Ta_2O_5$.

2. A process according to claim 1 wherein B includes 0.2 to 5% of $Sm_2O_3$ or $Ta_2O_5$.

3. A process according to claim 2 wherein B includes 0.2 to 5% of $Sm_2O_3$.

4. A process according to claim 3 wherein M is 0.

5. A process according to claim 1 wherein the catalysts A and B are in the form of particles having a size of 2 to 8 mm.

6. A process according to claim 1 wherein the catalysts A and B are in the form of tablets having a diameter of 2 to 8 mm. and a height of 2 to 8 mm.

7. A process according to claim 1 wherein the volume ratio of catalyst A to catalyst B is between 8 to 2 and 2 to 8.

8. A process according to claim 1 wherein the reaction temperature is between 280 and 400° C.

9. A process according to claim 8 wherein the reaction temperature is between 300 and 380° C.

10. A process according to claim 8 wherein the gas mixture consists essentially of said alkene, air and water and the molar proportions of alkene to air are between 1 to 8 and 1 to 20 and the molar proportions of alkene to water are between 1 to 1 and 1 to 25.

11. A process according to claim 10 wherein the molar proportions of alkene to air are between 1 to 8 and 1 to 15 and the molar proportions of alkene to water are between 1 to 2 and 1 to 8.

12. A process according to claim 11 wherein the alkene is propylene.

13. A process according to claim 10 wherein the alkene is propylene and the carboxylic acid is acrylic acid.

14. A process according to claim 8 wherein the alkene is propylene and the carboxylic acid is acrylic acid.

15. A process according to claim 14 wherein catalyst B includes 0.2 to 5 of $Sm_2O_3$.

16. A process according to claim 15 wherein M is 0.

17. A process according to claim 8 wherein the reaction temperature is between 300 and 380° C.

18. A process according to claim 17 wherein the gas mixture consists essentially of said alkene, air and water and the molar proportions of alkene to air are between 1 to 8 and 1 to 20 and the molar proportions of alkene to water are between 1 to 1 and 1 to 25.

19. A process according to claim 18 wherein the molar proportions of alkene to air are between 1 to 8 and 1 to 15 and the molar proportions of alkene to water are between 1 to 2 and 1 to 8.

20. A process according to claim 19 wherein the alkene is propylene and the carboxylic acid is acrylic acid.

21. A process according to claim 1 wherein the pressure is from atmospheric pressure to a superatmospheric pressure of 3 atmospheres.

22. A process according to claim 1 wherein the catalysts A and B include a carrier.

23. A process according to claim 22 wherein the carrier is a mixture of montmorillonite and highly dispersed silica.

24. A process according to claim 23 wherein the montmorillonite has a specific surface area of 0.5 to 30 m.$^2$/g. and the silica has a surface area of 50 to 500 m.$^2$/g.

25. A process according to claim 1 wherein the catalyst consists of (A), (B) and up to 5% of $Sm_2O_3$.

26. A process according to claim 25 wherein the reaction temperature is between 280 and 400° C.

27. A process according to claim 25 wherein the pressure is from atmospheric pressure to a superatmospheric pressure of 3 atmospheres.

28. A process according to claim 25 wherein the catalysts A and B include a carrier which is a mixture of montmorillonite having a specific surface area of 0.5 to 30 m.$^2$/g. and highly dispersed silica having a surface area of 50 to 500 m.$^2$/g.

References Cited

UNITED STATES PATENTS 3,639,269  2/1972  Roberstein _____ 260—533 NX

FOREIGN PATENTS 7008412  12/1920  Netherlands _____ 260—533 N
763,423  7/1971  Belgium _____ 260—530 N LORRANE A. WEINBERGER, Primary Examiner R. D. KELLY, Assistant Examiner